United States Patent [19]

Davis et al.

[11] 4,453,221

[45] Jun. 5, 1984

[54] MANIPULATOR WITH ADAPTIVE VELOCITY CONTROLLED PATH MOTION

[75] Inventors: Malcolm F. Davis; Charles M. Linser; Brian J. Resnick, all of Cincinnati, Ohio

[73] Assignee: Cincinnati Milacron Inc., Cincinnati, Ohio

[21] Appl. No.: 377,925

[22] Filed: May 13, 1982

[51] Int. Cl.³ .................. G06F 15/46; G05B 19/42
[52] U.S. Cl. ............................ 364/513; 318/568; 318/573; 364/174; 364/191
[58] Field of Search ........ 364/167, 171, 174, 191–193, 364/474, 475, 513; 318/568, 573, 571

[56] References Cited

U.S. PATENT DOCUMENTS

| | | | |
|---|---|---|---|
| 3,418,549 | 12/1968 | Emerson et al. | 318/39 |
| 3,671,839 | 6/1972 | Meyer et al. | 318/571 |
| 3,909,600 | 9/1975 | Hohn | 364/513 |
| 3,920,972 | 11/1975 | Corwin, Jr. et al. | 364/513 X |
| 4,086,522 | 4/1978 | Engelberger et al. | 364/513 X |
| 4,140,953 | 2/1979 | Dunne | 364/513 X |
| 4,237,408 | 12/1980 | Frecka | 318/571 |

OTHER PUBLICATIONS

Abele, "Adaptive Controls for Fettling of Castings With IR", *Robot Vision and Sensory Controls*, Apr. 1, 1981, pp. 81–90, Cotswold Press Ltd., Oxford, England.
Rudnicki et al., "The Application of the Adaptive Robot with Force Sensors to Casting-Cleaning Communication About Work in Progress", *Robot Vision and Sensory Controls*, Apr. 1, 1981, pp. 91–98, Cotswold Press Ltd., Oxford, England.

*Primary Examiner*—Joseph F. Ruggiero
*Attorney, Agent, or Firm*—John W. Gregg

[57] ABSTRACT

A manipulator and control are provided for moving a function element carried by the manipulator in accordance with programmed input signals defining positions and path velocities therebetween of a tool centerpoint associated with the function element. The path velocity is made susceptible of variation in accordance with unprogrammed variations of a parameter manually or automatically produced. Motion of the tool centerpoint is effected by interpolation of intermediate point along a predetermined path between any two preprogrammed positions. Each intermediate point is displaced from its predecessor by an increment computed in accordance with a fixed increment interval period and an instantaneously variable increment velocity. Incremental velocity values are computed selectively in accordance with a simple function relating the variable parameter and velocity and in accordance with the preprogrammed definition of motion.

16 Claims, 13 Drawing Figures

MANIPULATOR WITH ADAPTIVE VELOCITY CONTROLLED PATH MOTION

BACKGROUND OF THE INVENTION

This invention relates generally to program controlled manipulators and particularly to adapting programmed manipulator activity to unprogrammed variations of work process related parameters.

As distinguished from conventional machine tools wherein the primary axes of motion are axes of translation corresponding to the coordinate axes of a rectangular triordinate system, manipulators achieve greater flexibility by including axes of rotation to effect orientation of a tool or workpiece carried thereby. By virtue of this greater flexibility, particularly true of articulated or anthropomorphic machines, programmable manipulators are applied to tasks requiring controlled motion and which previously were performed manually even though the work environment posed serious health hazards. Examples of such work include seam welding, spray coating, and rough casting cleaning. The principal obstacle in any such application is the in-process adaptation of motion control to unprogrammed variations of process parameters such as weld pool variations with seam gaps, coating fluent viscosity variations with temperature and humidity, and the cutting torque variations with rough casting flash and gate. While there are a number of procedures for altering a program path to accomodate sensed conditions requiring deviations, it has heretofore been unknown to automatically vary the velocity of the motion of the program controlled manipulator to accommodate process parameters such as those mentioned. Nevertheless, these tasks as well as many others, are readily made adaptable to nonprogrammed parameter variations by permitting the programmed motion to be subject to velocity variations defined in accordance with a suitable function relating a measured process parameter and the path velocity.

It is, therefore, an object of the present invention to provide a manipulator and control for moving a function element in response to programmed input signals describing the motion and responsive to unprogrammed variations of a process parameter to vary the velocity of motion.

It is a further object of the present invention to provide a manipulator and control for moving a function element in accordance with a preprogrammed description of the motion and selectively responsive to unprogrammed variations of a work process parameter to vary the velocity of motion.

It is a still further object of the present invention to provide a manipulator and control for moving a function element in accordance with a preprogrammed description of the motion and responsive to a function relating values of a measured process parameter to velocity to vary the velocity of motion.

It is a still further object of the present invention to provide a manipulator and control for moving a function element in response to input signals defining positions relative to a rectangular coordinate system and path velocities therebetween and responsive to the measured values of the work process parameter for varying the effective path velocity during an automatic mode of operation.

Further objects and advantages of the present invention shall become apparent from the accompanying drawings and the description thereof.

SUMMARY OF THE INVENTION

In accordance with the aforesaid objects, a manipulator and control are provided which are responsive to input signals defining positions of a point associated with a function element and path velocities therebetween for effecting controlled motion of the point along a predefined path. The positions are described with reference to the axes of a triordinate coordinate system and the manipulator includes rotational axes of motion joining machine members defining a machine coordinate system. Motion is effected by interpolation of intermediate points corresponding to end points of incremental spans along the path and transforming the intermediate point coordinates to machine coordinates to command motion of the machine coordinate axes. Each increment has associated therewith an incremental path velocity used to calculate an incremental span length. Means are provided for continuously monitoring a work process parameter and the control selectively executes a procedure for evaluating a function relating a parameter value to the input velocity. An incremental velocity value derived from the work process velocity function is selectively produced and used by the intermediate point interpolation process to effectively vary the velocity of the point along the path.

BRIEF DESCRIPTION OF THE DRAWINGS

FIGS. 6a through 6d are flow charts of subroutines and major sections of the flow chart of FIG. 5a.

FIG. 7 is a flow chart of the adaptive velocity procedure used by the interpolation procedure of FIG. 5a.

DESCRIPTION OF THE PREFERRED EMBODIMENT

For purposes of illustrating the invention, a manipulator and control combination constituting a preferred embodiment shall be described. The manipulator and control correspond to those manufactured by Cincinnati Milacron Inc., the assignee of the present invention. It is to be understood that the particular structure of the manipulator of the preferred embodiment is not to be construed as a limitation on the present invention. Rather, any machine incorporating serially linked axes of rotary motion controlled by interpolation of intermediate points along a predetermined path defined with reference to a rectangular coordinate system or any other coordinate system determined independently of the machine axes is suitable for application of applicants' invention.

Figure 1:
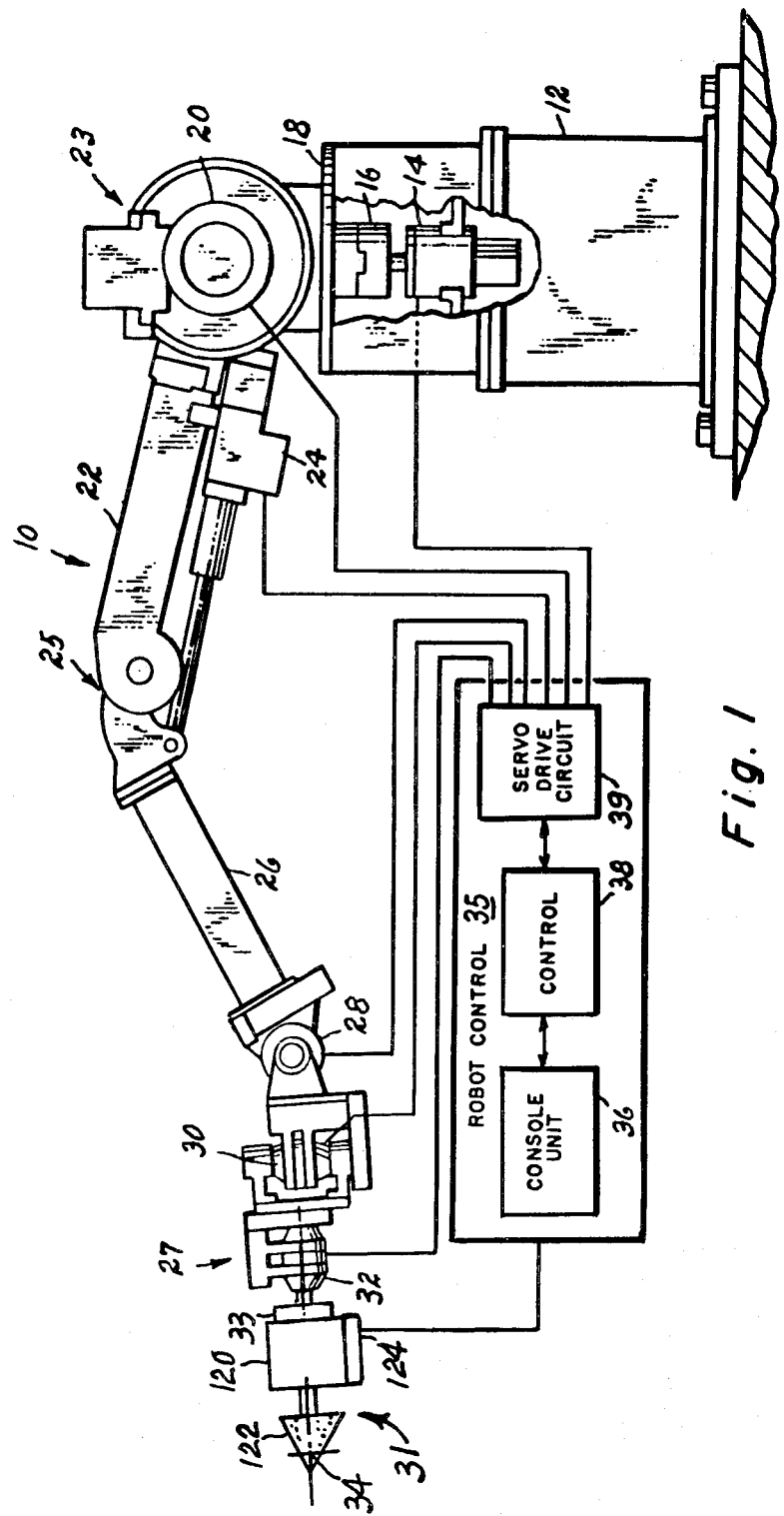
FIG. 1 shows an articulated manipulator and the schematic connection thereof to the control.

Referring to FIG. 1, the articulated manipulator 10 is shown connected to control 35 and carrying grinding tool 122 and tool motor 120. The manipulator 10 includes base 12 upon which is rotatably mounted the shoulder plate 18 and within which are the shoulder rotation actuator 14 and the intermediate coupling 16. Actuator 14, coupling 16 and mounting plate 18 cooperate to effect rotation of the manipulator structure about a vertical axis passing through the center of plate 18. Upper arm 22 is rotatably supported upon plate 18 at the shoulder joint 23 and rotated about a horizontal axis intersecting the vertical axis through the center of the shoulder joint 23. Rotation of the upper arm 22 about this axis is effected by actuator 20. A forearm 26 is connected to upper arm 22 at an elbow joint 25 and is rotated thereabout by means of actuator 24 which may be a lineal actuator such as a piston and cylinder or screw and nut. The actuators 14, 20, and 24 are sufficient to effect motion of the forearm 26 to place the end thereof in any position within the volume described by the mechanical limitations of the structure.

To maximize the flexability of motion achieved by control of the manipulator, three additional axes of motion follow forearm 26. These three additional axes are intended to effect control over the orientation with respect to a relocatable point of reference of the tool carried by the manipulator. The first of these three orientation axes corresponds to a rotation about a horizontal axis at the end of the forearm 26 and driven by actuator 28 to effect changes in pitch of a tool carried by the manipulator. The second orientation axis is perpendicular to the first and effects changes of yaw of the tool carried by the manipulator and is driven by actuator 30. The third orientation axis, for controlling roll, is perpendicular to the first and second axes and is driven by actuator 32. These three orientation axes constitute the wrist 27 of manipulator 10.

At the end of wrist 27, is the face plate 33 to which is mounted the tool motor 120 carrying the grinding tool 122. Attached to tool motor 120 is a transducer 124 for feeding back a measured parameter of the work process. The motor 120 and tool 122 constitute a function element 31 carried by manipulator 10. There are a broad variety of tools or article grasping devices which may be used depending on the work process to be performed. The stored program for controlling the motion of function element 31 specifies positions of a tool centerpoint 34 and orientations of the function element 31 with respect to tool centerpoint 34.

Control 35 includes a console unit 36 to permit communication between an operator and the manipulator 10, a control 38 for processing a stored program directing the movements of manipulator 10, and a servodrive circuit 39 responsive to control 38 for controlling the machine actuators 14, 20, 24, 28, 30 and 32. Since the particular type of actuators and drive circuits do not form a part of the present invention, further details of these devices shall not be provided.

Figure 2:
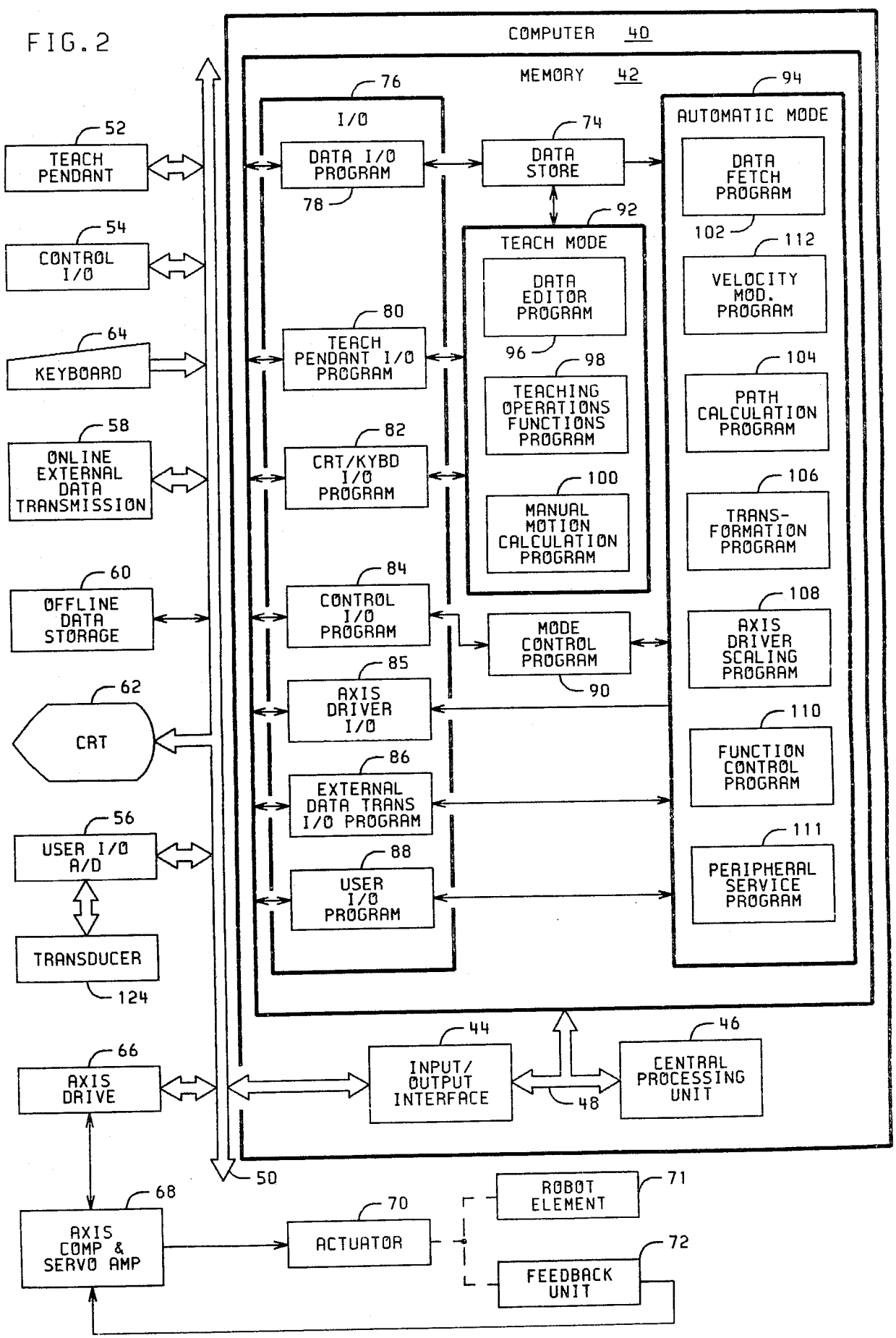
FIG. 2 is a block diagram of the control with its associated input and output interface modules.

Referring to FIG. 2, a detailed block diagram of the control shall be described. The control 35 includes a programmable general purpose digital computer 40 comprised of a memory 42, a central processing unit 46 and an input/output interface 44. These three elements are interconnected by bus 48. Interaction between computer 40 and the manipulator 10 and an operator are carried out by signals passed over the external bus 50 connected to a number of peripheral devices. The peripheral devices most suitable for use by an operator include the teach pendant 52 for manually producing motion commands to generate a stored program, keyboard 64 for entering information to computer memory 42 and CRT 62 for displaying data relating to the current activity of the manipulator and its stored program.

The peripheral devices used to interface the manipulator 10 to control 35 include: the control input/output interface 54, which exchanges a number of discrete device signals between the manipulator and control necessary for the operation of manipulator 10; the user input/output interface 56, which exchanges signals to and from application dedicated devices associated with manipulator 10, and shown in this case incorporating an analogue-to-digital converter being connected to the transducer 124; and the axis drive interface 56 which directly controls the motion of the actuators. The axis drive 66 accepts data in digital form and executes a digital-to-analogue conversion thereby providing an analogue signal to the axis compensation and servoamplifier 68. The compensated analogue signals are then used as an input to an actuator 70 which drives the robot element 71 mechanically attached thereto. A feedback device 72, mechanically connected to actuator 70 or robot element 71 provides a feedback signal representing the actual motion of the driven element of the robot arm. Although there are several configurations for control of the servomechanism loop for each element of the robot arm, in the preferred embodiment, the axis drive 66, servoamp 68, actuator 70 and feedback element 72 are utilized in numbers equal to the number of controlled axes on the manipulator.

Two further peripheral devices permit exchange of program data. First, the on-line external data transmission interface 58 represents a device which allows data to be entered into the computer 40 from an external data store while the manipulator is executing a cycle of operation. Secondly, an off-line data storage interface 60 is provided for allowing program data to be input to the computer by means of such devices as a punched tape reader, a cassette reader, etc.

The memory 42 within computer 40 is comprised of two primary components. The first is the data store 74 which stores all numerical data information, and the second component defines the operating system of the manipulator. The operating system is a set of control programs directing the operation of computer 40 to effect the generation of the user's program and the execution of the stored user program. For purposes of illustration, the operating system programs are shown in functionally related sets including the input/output set 76, the teach mode set 92, and the automatic mode set 94.

Included in the input/output set 76, are the data I/O program 78, teach pendant I/O program 80, a CRT and keyboard I/O program 82, a control I/O program 84, an axis driver I/O program 85, an external data transmission program 86 and the user I/O program 88. Each of these input/output programs correspond to a different type of peripheral being interfaced to the control and is effective to control the signal exchange between the particular peripheral device and the computer 40.

The operating system also contains a mode control program 90 for switching control of the computer between the various operating modes, for example, manual, teach, automatic, etc. Since only the automatic mode is required for the disclosed invention, only this mode will be described in detail. Within the teach mode system 92 are the data editor program 96 and a teaching operation function program 98. These two programs control the operation of the manipulator during the teach mode, and the specifics of these programs are either described in U.S. Pat. No. 3,920,972 or are available from Cincinnati Milacron Inc. The automatic mode set 94 includes a data fetch program 102, a path calculation program 104, a transformation program 106, an axis driver program 108, a function control program 110, a peripheral service program 111, and a velocity modification program 112. Details of the path calculation and velocity modification programs shall be provided herein and details of the other programs are either specifically described in U.S. Pat. No. 3,909,600 or are available from Cincinnati Milacron Inc.

Figure 3:
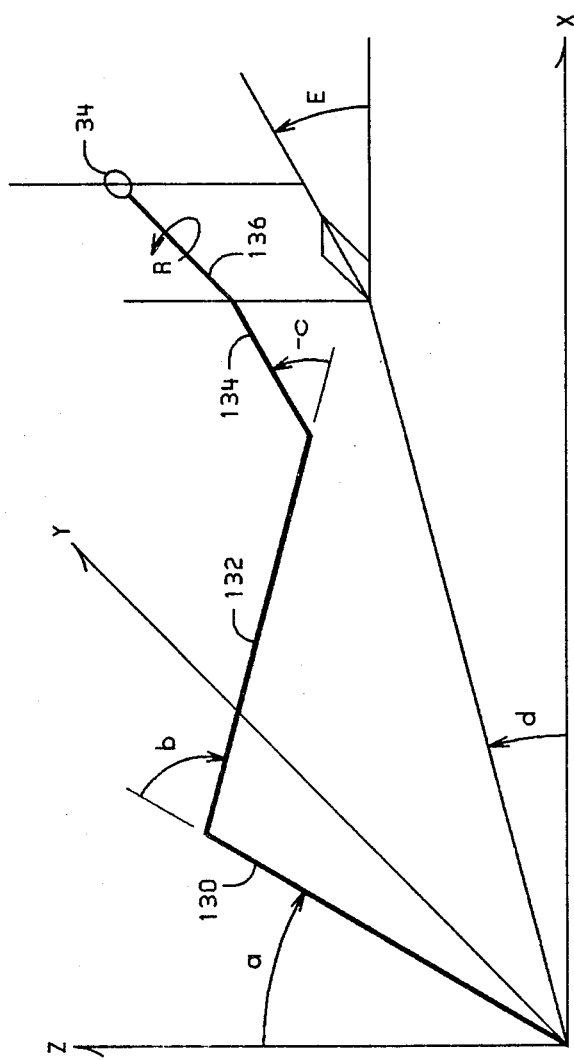
FIG. 3 is a geometric representation of the machine defined generalized coordinate systems.

The machine coordinate system of manipulator 10 shall be described with reference to the schematic representation of FIG. 3. As has heretofore been described, each axis of motion of manipulator 10 is an axis of rotary motion. Assume that the rectangular coordinate system of FIG. 3 has its origin located at a point slightly above mounting plate 18 and coinciding with the axis of rotation of actuator 20. The Z axis coordinate coincides with the center of rotation of mounting plate 18. Thus, rotations of mounting plate 18 corresponds to motion through the angle "d". Line segment 130 corresponds to upper arm 22 and rotation about the center of actuator 20 corresponds to a rotation of line segment 130 through the angle "a" measured positively with respect to the Z axis in the direction indicated by the arrow. The line segment 132 corresponds to the forearm 26 and rotations of forearm 26 about the elbow joint 25 correspond to rotations of line segment 132 through the angle "b" measured positively in the direction indicated by the arrow in FIG. 3. The first bend axis of the wrist 27 at actuator 28 corresponds to a rotation of line segment 134 through the angle "c" measured in the negative direction from the extension of line segment 132 as indicated by the arrow. The second bend axis of wrist 27 corresponding to the rotation of the actuator 30 is illustrated by the rotation of line segment 136 through the angle "E" measured with reference to the X axis and shown by projection in the X-Y plane. The roll of wrist 27 corresponds to the rotation of line segment 136 indicated by the angle "R". The tool centerpoint 34 is defined as a point at the end of line segment 136. The length of segment 136 includes the user specified tool length and the length of elements of wrist 27 beyond the yaw axis. The stored program includes the X,Y and Z axis coordinates of tool centerpoint 34 together with the angles of orientation D, E, and R. The orientation angle D is equal to the sum of angles "a", "b", and "c". As shown in FIG. 3, tool centerpoint 34 is located on the axis of line segment 136; however, an offset tool centerpoint may also be accommodated. It should now be apparent that provided the lengths of segments 130 through 136 are known and provided the program specifies the orientation angles for pitch, yaw, and roll, D, E, and R, respectively, and provided the X, Y and Z coordinates of tool centerpoint 34 are specified, then the unique combination of actuator angles a, b, c, and d can be determined. These actuator angles together with the actuator angles of the orientation axes E and R comprise the machine coordinate system. The details of the method of transformation from the program coordinates to the machine coordinate system is described, in U.S. Pat. No. 3,909,600 except for the roll axis, wherein the term generalized coordinate system corresponds to the machine coordinate system hereinabove described.

Figure 4A:
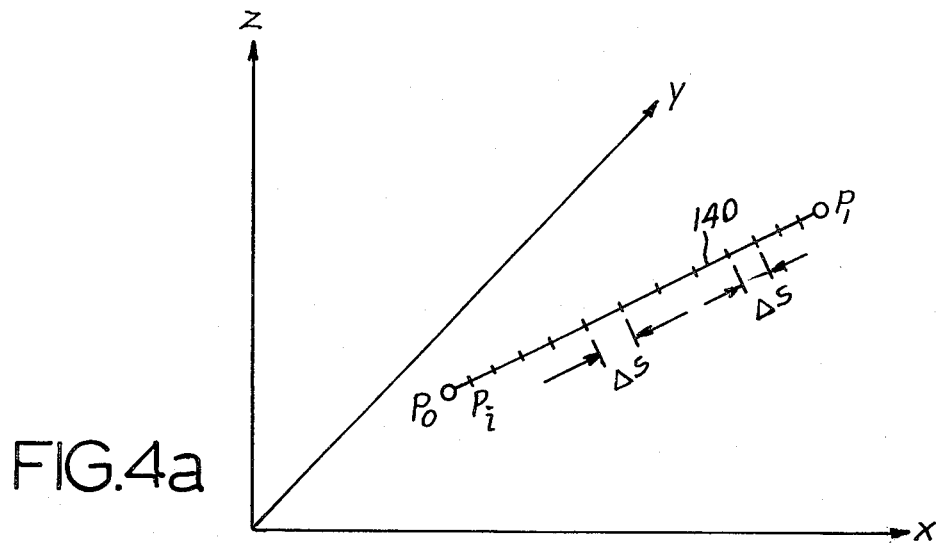
FIGS. 4a through 4c are geometric representations of the motion control effected over the tool carried by the manipulator.
Figure 4B:
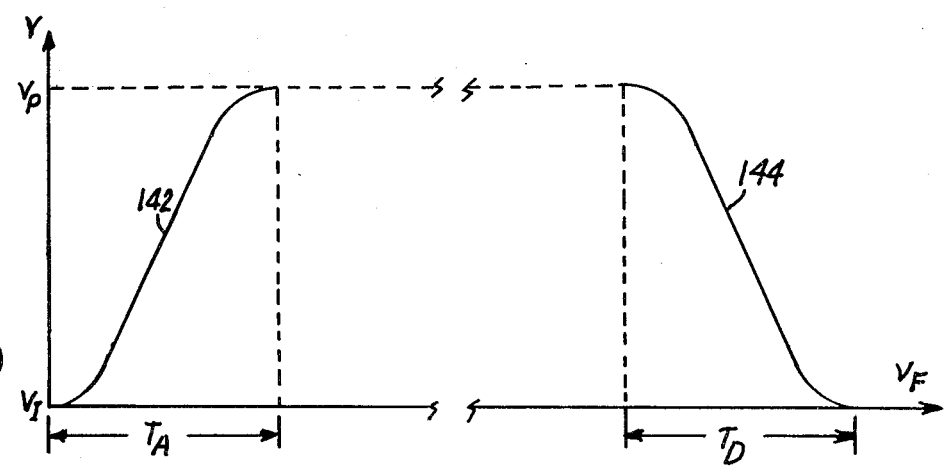
Figure 4C:
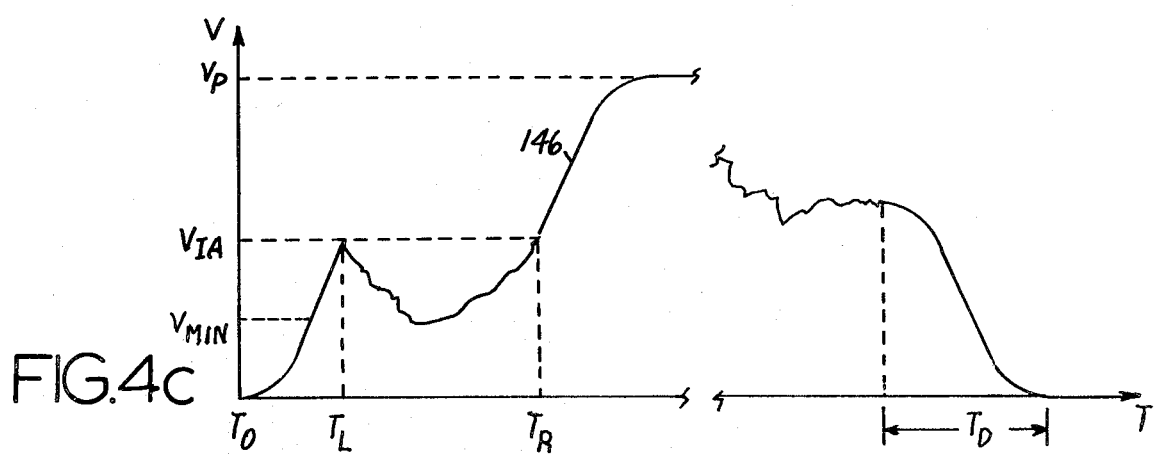

Referring to the geometric schematic representation of FIGS. 4a through 4c the path control scheme of the present invention shall be described. In FIG. 4a, the straight line segment 140 represents the path of motion along which the tool centerpoint is to proceed in travelling from programmed point P0 to programmed point P1. The control interpolates intermediate points $P_i$ along this straight line path. Other predetermined paths, such as circular or parabolic, may be chosen for interpolation. The coordinates of points P0,P1 and the intermediate points $P_i$ are all defined with respect to the X, Y, Z coordinate system. Assuming that the tool centerpoint is to start from rest at point P0, and come to rest again at point P1, then the path control scheme provides automatic acceleration and deceleration to and from a programmed velocity. While the intermediate points $P_i$ are produced according to a fixed increment interval period $\Delta t$, the actual incremental distance between points $P_i$ varies as the velocity of the tool centerpoint varies. Thus, the incremental distance $\Delta S$ which corresponds to the distance traversed during a constant incremental interval $\Delta T$ is seen to vary between the constant velocity portion of the motion and the acceleration and deceleration phases of the prescribed motion. In accordance with the basic path control scheme employed, the velocity variations between points P0 and P1 are accomplished so as not to introduce velocity discontinuities between the acceleration and deceleration phases.

Referring now to FIG. 4b, the velocity characteristic of a typical span such as span 140 is shown. The span is started at an initial velocity $V_i$, which may be, but need not be zero, and a continous function of acceleration produces the curve 142 to bring the tool centerpoint velocity to the programmed velocity $V_p$ in an acceleration period $T_A$. Following a period of constant velocity, the control initiates a deceleration phase to reduce the centerpoint velocity to a final velocity $V_f$ following a continuous function of deceleration to produce curve 144. The deceleration from programmed to final velocity, which again may be, but need not be zero, is accomplished in a deceleration pariod $T_d$. The gradual transistion to and from the constant velocity phase corresponds to the actual performance to be expected from the physical structure of the manipulator when inertia of the actuators and members are taken into consideration.

FIG. 4c is representative of the deviation from the typical velocity characteristics effected by the adaptive velocity function implemented by applicants' invention. Initially, the velocity follows the characteristics curve 142 until a minimum velocity $V_{min}$ is reached, below which adaptive velocity variations are not permitted. Once the actual velocity has exceeded the minimum velocity $V_{min}$ and assuming the controlling process parameter value requires reduction of velocity, velocity control departs from the normal acceleration function and velocity is varied in accordance with the adaptive velocity function. Incremental values of velocity are produced in accordance with a predefined function relating velocity and the work process parameter and are used by the path control algorithm to interpolate intermediate points along the path. As long as the calculated adaptive incremental velocities are less than the nonadaptive velocity $V_{ia}$ effective when the adaptive velocity function first produces a reduced value, the calculated values control. Once the adaptive value is equal to or greater than the initial nonadaptive value $V_{ia}$, the initial value $V_{ia}$ is substituted and nonadaptive operation continues. This effect is illustrated by the portion of curve 146 between $T_i$ and $T_r$. During this adaptive operation, the velocity is shown to reach a minimum value of $V_{min}$ below which further reduction is not permitted. Following $T_r$ the velocity is accelerated in accordance with the nonadaptive acceleration function to the programmed velocity $V_p$. During a subsequent period of adaptive velocity operation, it is determined that deceleration must be initiated to bring the tool centerpoint to the required final velocity. During the deceleration period, $T_d$ adaptive operation is not permitted and the velocity decelerates following the nonadaptive deceleration function illustrated by curve 144 of FIG. 4b. The details of the control procedure for effecting the adaptive velocity control shall be described in detail subsequently.

Figure 5A:
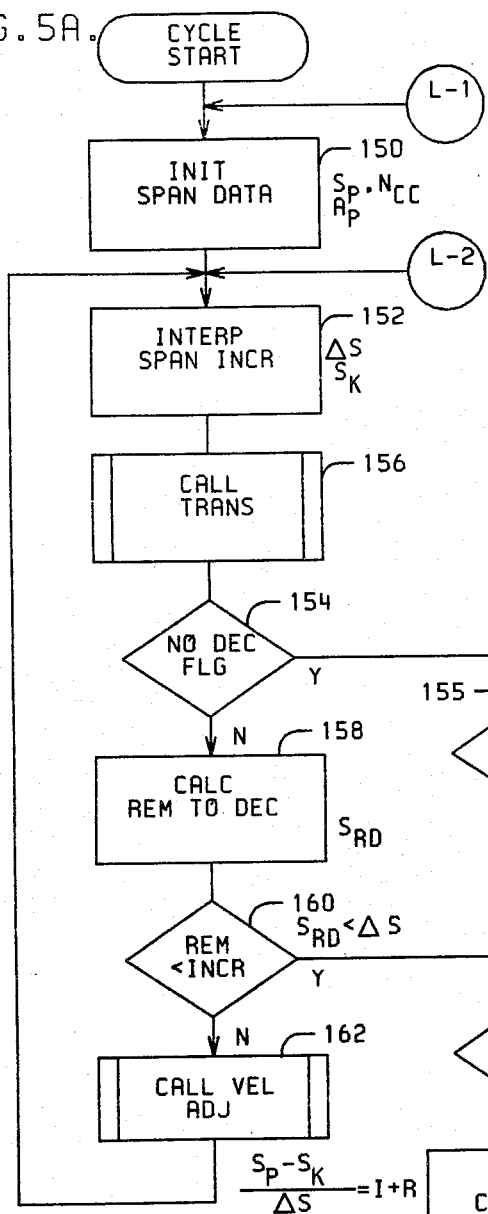
FIGS. 5a and 5b are flow charts of the two principle control procedures effecting motion control.

The overall cycle of operation of manipulator 10 in the automatic mode is illustrated by the flow chart of FIG. 5a. At process step 150 the control initializes the span data required to interpolate the motions between the program points P0 and P1 at the programmed velocity $V_p$. Values for the programmed span length $S_p$, the coordinate component ration $N_{cc}$ and a nominal acceleration are produced by the procedure associated with step 150. At process step 152 an increment along the path $\Delta S$ and the accumulated interpolated distance $S_K$ is computed. Process step 156 calls the subroutine to effect a transformation of the interpolated intermediate point to the generalized coordinates to produce a set of machine coordinate signals representing coordinate values relative to the generalized coordinate systems. At decision step 154, the flag indicating no deceleration is to take place is tested. When the motion of tool centerpoint 34 is to be continuous through a programmed position, a function attribute so indicating is programmed. It may then occur that no deceleration would be required in the present span and the no deceleration flag would be set as described subsequently. In that case, the process would continue following the yes side of decision step 154 to decision step 155 where it is determined whether the current increment is the last increment of the current span. If not another increment is interpolated through the connector L-2. Eventually, the final increment of the current span would be interpolated and the overall cycle of operation would continue from decision step 155 to process step 168 through connector L3. Process step 168 causes the function programmed with position P1 to be executed when the machine axes have reached the end of span. Thereafter, decision step 170 determines whether the programmed position P1 corresponds to the end of the program. If not, the cycle is repeated by accessing the next programmed data at process step 150 by the connector L-1. If the position is the last position of the program then the entire program is recycled beginning at a preselected programmed position as indicated by terminal 172.

Assuming that the no deceleration flag had not been set, then the overall cycle of operation from decision step 154 continues at process step 158. Process step 158 calculates the distance remaining in the current span prior to the point at which a deceleration to stop must begin. When the remaining distance $S_{RD}$ to the beginning of the deceleration phase is greater than the current incremental distance $\Delta S$, then the cycle continues through process step 162 which calls the velocity variation subroutine for instantaneously changing the incremental velocity value in accordance with nonprogrammed variations of a work process parameter. Upon completion of this subroutine the procedure continues through the loop to process step 152 where the span increment is interpolated using the most recently created value of incremental velocity. Once the distance remaining in the span prior to the starting point for deceleration is less than the current incremental distance, then the YES side of decision step 160 leads to the test for the indication in the stored program that the next point $P_1$ is a continue point. As each point programmed may have associated with it a function signal designating a particular function associated with the work process to be performed at that point, continue points are marked by the presence of a continue attribute associated with a specific function signal. Assuming that the continue code was not detected by decision step 164 than the deceleration procedure is called by process step 166. The decleration procedure effects the interpolated deceleration to the stopping point P1. Thereafter, process step 168 causes the execution of a function programmed in association with the point P1. Decision step 170 then determines whether or not the current point represents the end of the robot program and if not the procedure continues through the connector L1 to process step 150 to process data for the next programmed position. If the current position is the end of the stored program, then the program is repeated by selecting a program entry designated as a recycle position as indicated by the terminal 172.

If at the point of beginning deceleration, it had been determined that the next point was a continue point by decision step 164, then the process continues at process step 180 where a new value for the current span length is produced. Because the interpolated intermediate positions are spaced apart by an incremental distance defined by the increment interval period and the effective increment velocity, it is anticipated that when motion is to continue through a programmed position the distance remaining in the span from the deceleration decision position to the programmed end position will not always equal an integral multiple of the current incremental distance. To account for this discrepancy the current span is effectively terminated at the integral multiple of the current incremental distance nearest the programmed end position. To accomplish this, the distance remaining $(S_p - S_k)$ is divided by the incremental distance $\Delta S$ to produce the integer multiple I and remainder R. The current span length is then reduced by the remainder R to produce the continue span length $S_{CP}$. This distance then redefines the end position of the current span and the start position of the next span.

At decision step 174 a determination is made whether the included angle between the current span and the next span is less than 120 degrees. This determination is made by producing two values $S_T^2$ and $S_{T(120)}^2$ for the square of the total distance between the start position P0 of the current span and the end position P2 of the next span. The first value $S_T^2$ is computed as the sum of the squares of the coordinate component differences between the two positions. The second value $S_{T(120)}^2$ is computed in accordance with the equation for the length of the third side of a triangle given the lengths of the other two sides and the angle between them:

$$W\gamma = A^2 + B^2 = 2AB \cos \gamma$$

which reduces to:

$$W = A^2 + B^2 + AB \text{ when } \gamma = 120 \text{ degrees}$$

Since the result of process step 180 was to produce a new end position for the current span the length of the spans have been altered from the programmed lengths. The length of the current span is $S_{CP}$ and the length of the next span $S_N$ is defined by the new start position of step 180 and the programmed end position P2 of that span. If the included angle is less than 120 degrees, then it is necessary to bring the motion to a halt before proceding and the process would again continue through the call to the deceleration procedure at process step 166. If the included angle is 120 degrees or greater, then the process continues at decision step 176 to determine whether or not the programmed velocity of the next span $V_{PN}$ is greater than or equal to the current programmed velocity $V_P$. If the programmed velocity of the next span $V_{PN}$ is less than the programmed velocity $V_P$ of the current span, then it is necessary to effect a deceleration in the current span so that the motion in the next span will be started at the velocity programmed for that span. Following the deceleration procedure called by the process step 178, the overall cycle is continued at the process step 168 through connector L-3. If the programmed velocity for the next span is greater than or equal to the programmed velocity of the current span, then the process from decision step 176 continues through process step 177 where the no deceleration flag is set and thereafter via connector L-2 to the process step 152. It should now be apparent from the foregoing description that the overall cycle of operation consists of the repeated interpolation of intermediate points defining spans between the programmed points by iteratively repeating control processing procedures and the execution of the functions associated with the programmed positions.

Figure 5B:
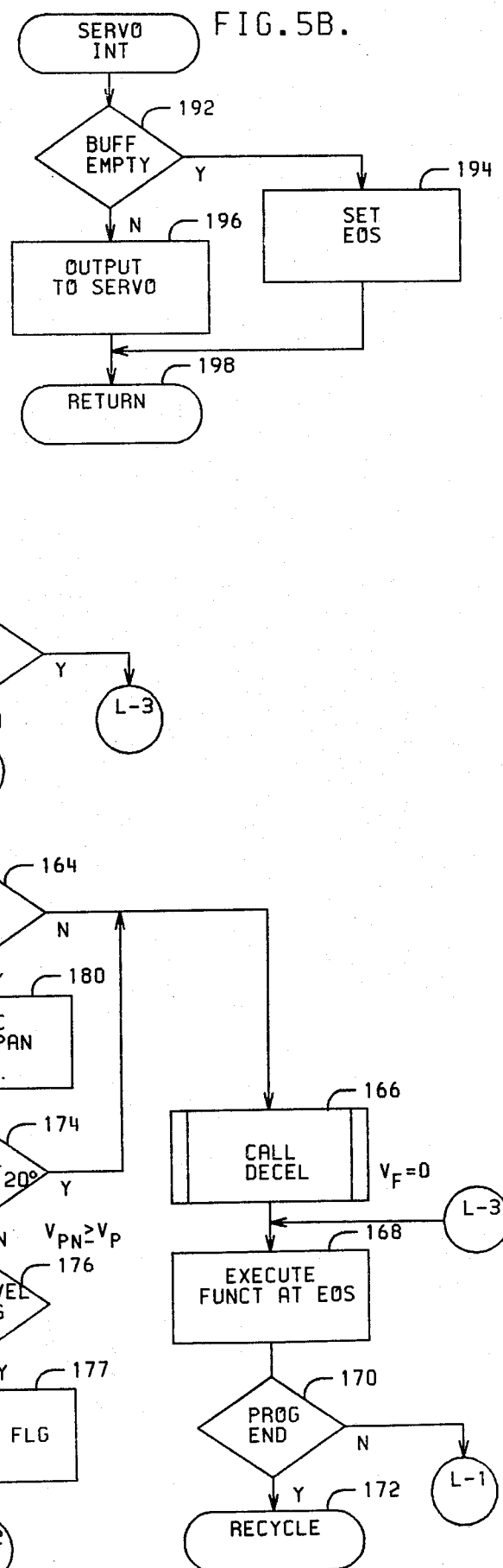

Referring now to FIG. 5b, the routine for servicing the actuator servomechanisms is shown. While the overall cycle of operation is being executed, an independent servointerrupt service routine is processed. A servo system clock generated by central processing unit 46 periodically interrupts the overall system processing to apply the freshly created actuator coordinate data to the actuator servomechanisms. Decision step 192 determines whether or not the buffer storage area for the actuator command data is currently empty. If the buffer is empty, then the current span has been completed, and the end of span flag is set by process step 194. However, if there is data in the buffer, then process step 196 transfers the data from the buffer to the servo. In either event, the servicing of the servointerrupt is complete and the overall system processing under control of the flow chart of FIG. 5a is continued by the return through terminal 198.

The flow charts of FIGS. 6a through 6e correspond to major segments or subroutines of the flow chart of FIG. 5a. Particularly, the flow chart of FIG. 6a corresponds to the process step 150 of FIG. 5a. At process step 200 programmed span data corresponding to input signals is recalled from data store 74 of memory 42. The start point P0, end point P1 and program velocity $V_p$ define the motion to be next executed by tool centerpoint 34. The programmed coordinate data recalled from memory are shown subscripted in correspondence with the program point designation. At process step 202 the total span length $S_p$ is computed using the rectangular coordinates of the two programmed points and extracting the square root of the sum of the squares of the coordinate components. At process step 204, the in-axis component ratios $N_{cc}$ of the programmed coordinate system are computed by dividing the coordinate components by the span length. These ratios are designated $N_{11}$ through $N_{16}$. Axis component ratios for the orientation angles are computed in the same way as the component ratios for the rectangular coordinate axes. At process step 206, a nominal span acceleration rate $A_P$ is calculated by dividing the programmed velocity $V_P$ by an arbitrarily chosen interval of one quarter second. Once this preliminary computation of span variables is completed, the overall cycle of operation continues through the terminal 208 to the process block 152 of FIG. 5a.

Figure 6A:
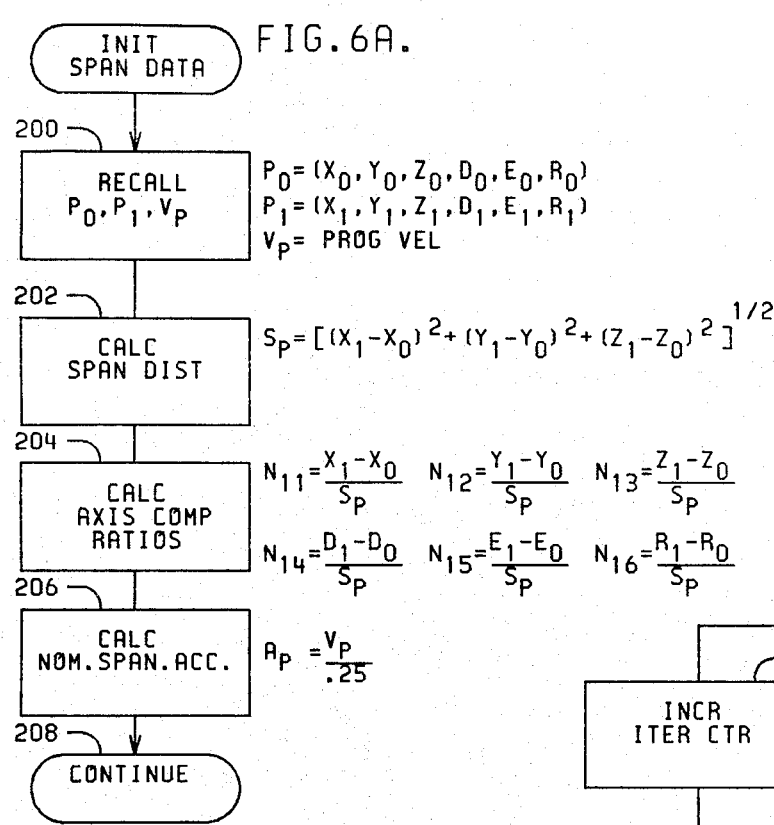
Figure 6B:
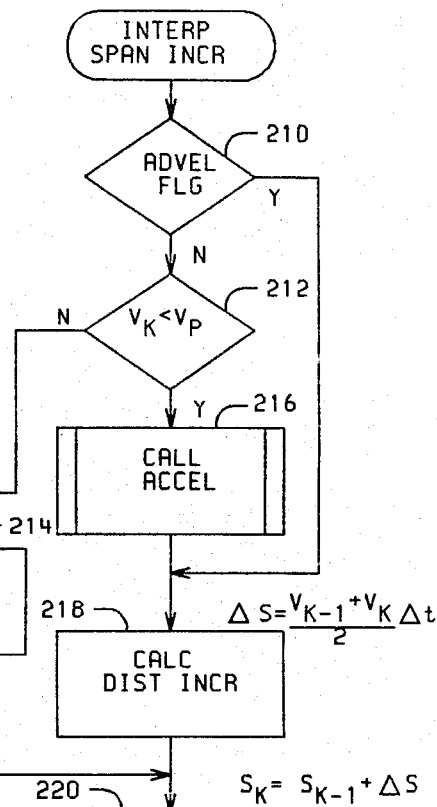

Referring now to FIG. 6b, the process step of interpolation of a span increment corresponding to block 152 of FIG. 5a is expanded into a more detailed flow chart. Beginning at decision step 210, the determination is made whether or not an adaptive or nonprogrammed velocity flag has been set by the subroutine called by process step 162 of FIG. 5a. If there is no adaptive velocity function programmed for the current span, or if the adaptive velocity function has not resulted in a change to the incremental velocity value, then the adaptive velocity flag will not be set, and the process will continue at decision step 212. Decision step 212 tests the current value of the increment velocity signal $V_K$, that is, the incremental velocity for the current iteration, against the value of the programmed velocity $V_P$ to determine whether or not the current incremental velocity $V_K$ is less than the programmed velocity. If so, the process continues at the process step 216 which calls the acceleration subroutine. The effect of the acceleration subroutine is to produce a new value for the increment velocity signal $V_K$ in accordance with a continuous function of acceleration shown and described with reference to FIG. 4b. Thus, at the beginning of a move where the tool centerpoint starts from rest, the initial value of the incremental velocity shall be zero, the programmed velocity will of course be a nonzero value and the call to the acceleration subroutine at process step 216 begins the change of the incremental velocity values in accordance with the continuous function of acceleration. Upon completion of the acceleration subroutine, the process continues at process step 218 where an incremental distance $\Delta S$ is calculated in accordance with the formula set forth to the right of the process step of FIG. 6b. This formula produces a value for the increment distance signal $\Delta S$ by averaging the new incremental velocity value $V_K$ with the previous incremental velocity value and assuming the average is effective during the incremental interval period represented by the increment interval signal $\Delta t$. When the adaptive velocity function flag is set, the incremental distance is computed using the velocity value produced by the adaptive velocity subroutine. When the incremental velocity is not less than the programmed velocity $V_P$, it is not necessary to calculate a new value for the increment distance signal and it is only necessary to increment the iteration counter as indicated by process step 214. In either event, the process ultimately resumes at process step 220 where a value for the accumulated increment distance signal $S_K$ is calculated in accordance with the equation set forth to the right of process step 220. The overall cycle of operation is then continued by the continue of flow chart terminal 221. The overall cycle of operation continues by calling the transformation subroutine illustrated in the flow chart of FIG. 6c.

Figure 6C:
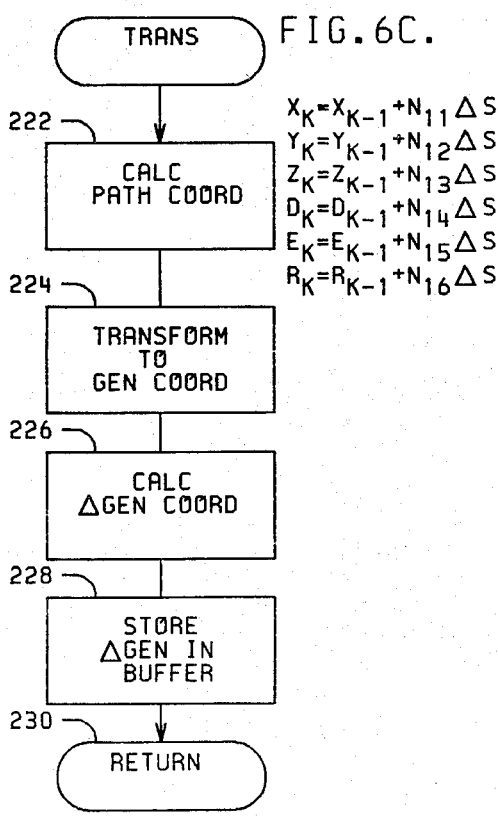

Referring to FIG. 6c, at process step 222 the path coordinates of the accumulated increment distance are calculated to produce end point coordinate signals. This is accomplished by summing the in-axis components of the interpolated increment distance with the coordinates of the previous increment end point. Thereafter, the coordinates with reference to the programmed coordinate system of the end point are transformed to coordinates of the generalized or machine coordinate system by process step 224 to produce a set of machine coordinate signals representing values of the end point coordinates relative to the machine coordinate system. To avoid inverse trigonometric functions, an iterative approximation algorithm is used that produces an error function based on the current machine coordinate values. Details of this approach are shown in U.S. Pat. No. 3,909,600, which, to the extent necessary for describing this transformation algorithm, is hereby incorporated herein by reference. At process step 226, the change in the generalized coordinates is calculated; and at process step 228, the incremental differences of the generalized coordinates are stored in the buffer for access by the servointerrupt service routine. When the transformation subroutine is completed, the processing of the overall cycle of operation is resumed by the return through terminal 230. This, then, brings the process to decision step 154 of FIG. 5a. Assuming the overall cycle proceeds to process step 158 where the remaining distance to the beginning of the deceleration subspan is calculated, then the overall cycle executes the detailed flow chart of FIG. 6d.

Figure 6D:
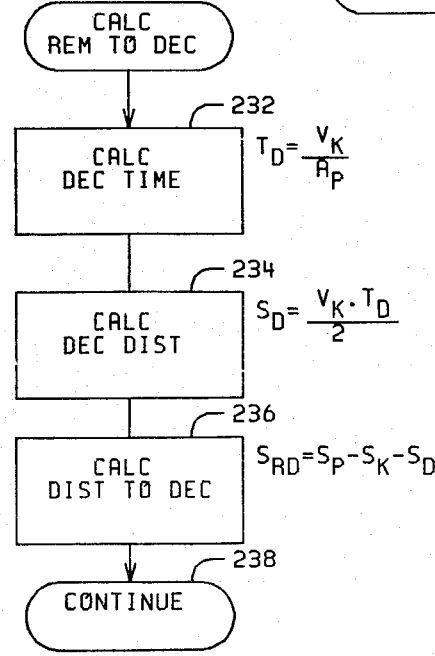

Referring now to FIG. 6d, process step 232 calculates the time required to decelerate assuming the nominal value of acceleration $A_P$, calculated during the preparation of the span variables, is effective during the period of deceleration, and the final velocity is zero. Thus, the approximate time required to decelerate is equal to the quotient of the current incremental velocity and this nominal constant of acceleration. At process step 234, the distance required to decelerate $S_D$ is calculated assuming that the average of the current incremental velocity and zero would be in effect during the interval calculated in process step 232. And finally, at process step 236, the remaining distance $S_{RD}$ within the span length from the current interpolated position to the point at which the just calculated deceleration distance $S_D$ must begin is calculated. Thus, the distance remaining $S_{RD}$ is equal to the total span length $S_p$ less the portion of the span represented by the accumulated interpolated distance $S_K$ and the portion of the span necessary to decelerate $S_D$. Following this calculation, the overall cycle of operation continues at decision step 160 of FIG. 5a wherein it is determined whether or not this remaining distance $S_{RD}$ is less than the current effective incremental distance $\Delta S$. If the remaining distance $S_{RD}$ is not less than the current effective incremental distance $\Delta S$ then another increment of that distance can be interpolated. If, however, the current effective incremental distance is greater than the calculated remaining distance, it is necessary to immediately begin deceleration.

The deceleration subroutine iteratively produces decreasing values of the incremental velocity variable $V_K$ in accordance with a continuous function of acceleration. At the start of the deceleration subroutine, the incremental velocity is recomputed to adjust for the round-off errors of the integer arithmetic executed by the computer used by applicants. Thereafter, the deceleration subroutine interpolates intermediate points following a continuous function of deceleration to bring the velocity of the tool centerpoint to a final velocity. The interpolation process is consistent with that described with reference to FIG. 6b, there being no acceleration subroutine call. Further, the deceleration subroutine effects transformation to the generalized machine coordinates by calling the transformation subroutine of FIG. 6c following computation of the accumulated interpolated distance.

It should be noted that while most programmed spans will include acceleration, constant velocity, and deceleration subspans or phases, the execution of the deceleration subroutine could be initiated before the tool centerpoint velocity reaches the programmed velocity. This would occur if the programmed span length were insufficient to parmit acceleration to the programmed velocity before decision step 160 of FIG. 5a determines the need to begin the deceleration. It should now be apparent that since the effect of the deceleration subroutine is to continue interpolation along the path to bring the tool centerpoint to a final velocity for the programmed span, the adaptive velocity procedure is not processed during the deceleration phase.

While the basic path control algorithm provides for continuous velocity variations during the acceleration and deceleration phases of motion, an additional velocity variation is readily accommodated as previously indicated with reference to process step 162 of FIG. 5a. While the preferred embodiment relates to velocity variations automatically produced in accordance with the unprogrammed variations of a work process parameter, manually produced parameter variations might as well be accomodated to permit an operator controlled velocity override. By means of transducer 124, a value of a work process parameter input signal such as the torque of tool drive motor 120 may be continuously monitored. This torque value may then be converted to a digital value at the user I/O analogue to digital converter 56; and, provided a suitable error function is devised, velocity variations may be produced in response to the measured torque. These velocity variations are then implemented in the overall cycle of operation by the subroutine called by process step 162 of FIG. 5a.

At the analogue to digital converter 56, chosen by applicants, the process parameter input signal value is converted to a five bit binary number defining the value of a process parameter signal. It will be appreciated by those skilled in the art that the range of the measured variable and precision necessary to effect sufficient control over the process dictates the resolution of the conversion from the analogue to the digital value. Thus, a greater or lesser number of binary digits for the process parameter signal may be appropriate in particular applications.

Figure 7:
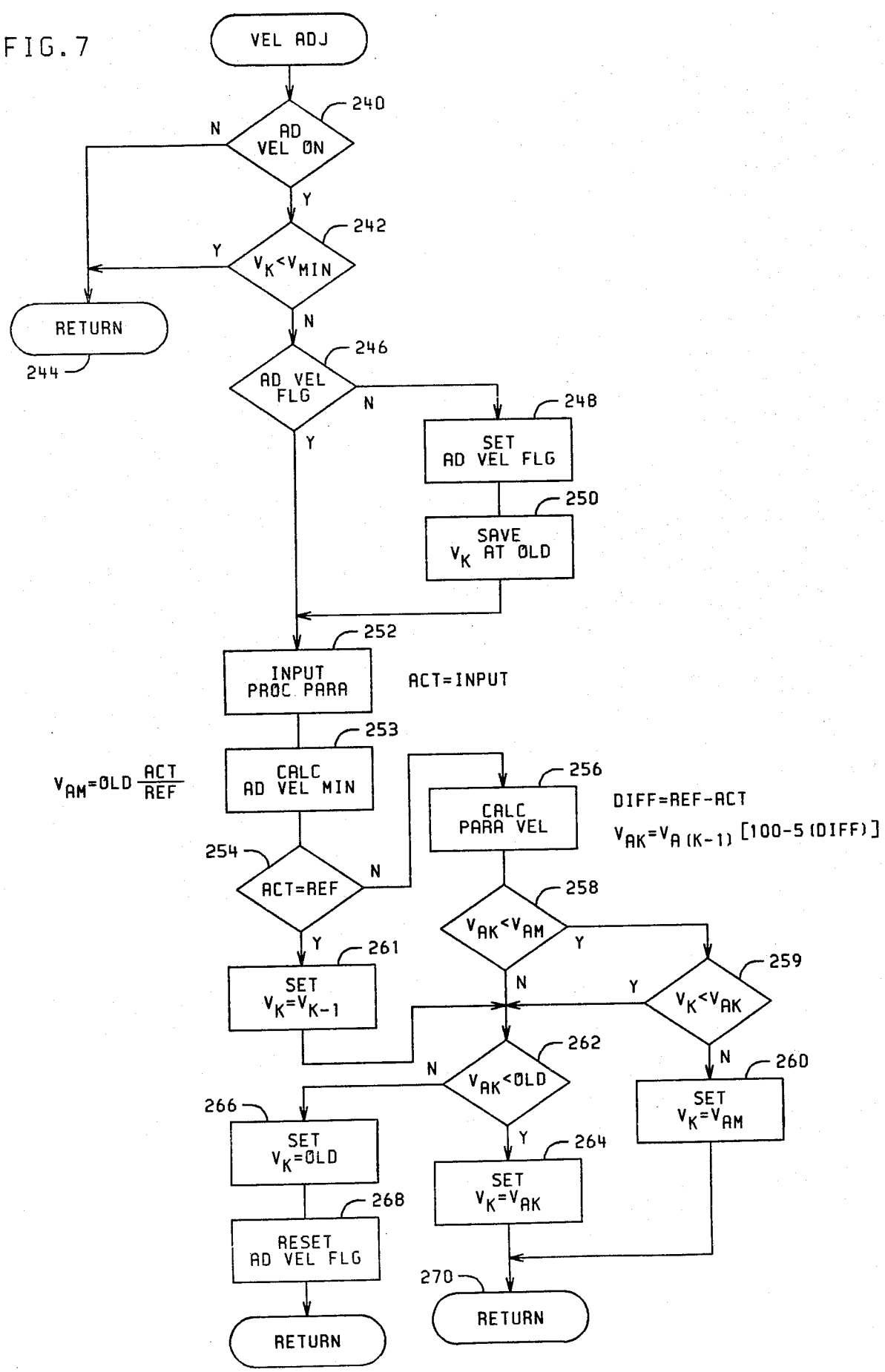

Referring now to FIG. 7, the subroutine for accomplishing adaptive velocity control is shown. Applicants' invention permits the specification of programmed spans as adaptive velocity spans by inclusion of the adaptive velocity function signal in the sets of input signals describing a particular programmed span. Therefore, at decision step 240, the test is made to determine whether the current programmed span has the adaptive velocity function programmed with it. If not, a return through terminal 244 is made which permits continuation of the overall cycle of operation at process step 152 of FIG. 5a. If, the adaptive velocity function has been programmed for the current span, then decision step 242 determines whether the current incremental velocity $V_k$ is less than the minimum velocity $V_{min}$ below which further reduction is not parmitted. If the current incremental velocity $V_k$ is less than the minimum velocity $V_{min}$, then a return is taken through terminal 244. If, however, the current incremental velocity $V_k$ is not less than the minimum velocity $V_{min}$, then the adaptive velocity procedure continues at decision step 246 to determine the current state of the adaptive control function status condition signal.

When the adaptive control subroutine produces an incremental velocity value which is effective to control interpolation for the current increment, then the adaptive velocity flag or status signal is set to indicate that the adaptive velocity procedure is controlling velocity. Thus, at decision step 246, if the adaptive velocity flag has been set, then the procedure continues at process stpe 252. If, however, the adaptive velocity flag is not set, then the procedure continues at process step 248 where the adaptive velocity flag is set. At process step 250, the current value of the increment velocity signal is saved or stored at a location assigned the name OLD. This saved incremental velocity value corresponds to the velocity value $V_{ia}$ of FIG. 4c. Following process step 250, the adaptive velocity procedure continues at process step 252 where the current value of the process parameter signal is input from converter 56. At process step 253 an adaptive minimum velocity value is calculated by multiplying the velocity value saved at old by the ratio of the value of the process parameter signal to the value of a process parameter reference signal which is programmed along with the input signals describing the manipulator motion. At decision step 254, it is determined whether or not the current process parameter value is equal to the process parameter reference value.

To permit the broadest spectrum of applications to be accommodated by a relatively simple adaptive velocity procedure, applicants have chosen to permit the specification of a value of a process parameter reference signal against which the actual or measured value of a process parameter shall be compared. Thus, in the particular example of rough casting cleaning where a variety of metal removal tools may be carried by tool motor 120, different torque values may be selected as the reference value above which velocity reduction is required. It will be appreciated by those skilled in the art that to effect control of the tool centerpoint velocity in accordance with a measured process parameter it is not necessary to specify a reference value and in fact suitable control may be accomplished where the velocity is varied by direct proportionality to a measured process parameter. In such a case, a process parameter reference value of zero would be assumed.

If it were determined by decision step 254 that the current measured value of the process parameter signal equaled the value of the process parameter reference signal then no velocity reduction is required and the adaptive process procedure continues at process step 261 where the adaptive process velocity $V_{AK}$ is set equal to the previous incremental velocity $V_{K-1}$. If, on the other hand, it was determined decision step 254 that the actual value of the process parameter signal were not equal to the reference value, then the procedure would continue at process step 256 where a new value of the process parameter velocity signal $V_{AK}$ would be calculated in accordance with the expressions set forth adjacent the process step 256. This formula calculates a current value for the process parameter velocity signal by multiplying the previous process parameter velocity signal value by the value of a parameter factor signal representing a percentage based on the difference between the measured process parameter and the reference value of the parameter. At decision step 258 it is determined whether this calculated value of the process parameter velocity signal is less than the adaptive minimum velocity $V_{AM}$ value and if it is not, then, the procedure continues at decision step 262. If the calculated value of $V_{AK}$ is less than the adaptive minimum velocity $V_{AM}$, then a further test is made at decision step 259 to determine whether the current value of the increment velocity signal $V_K$ is less than the value of the process parameter velocity signal $V_{AK}$. If $V_K$ is less than $V_{AK}$ then the process parameter factor has resulted in an increase in velocity and the process continues at decision step 262. It is noted that whether the process from decision step 254 had required a calculation of an adaptive velocity value, or the forced value of process step 261, the procedure may ultimately resume at decision 262. Here it is determined whether the effective adaptive velocity value is less than the value saved at OLD. If not, then at process step 266 the current value of the increment velocity signal is set equal to the value saved at OLD and at process step 268 the adaptive velocity flag is reset. Thereafter, the overall cycle of operation is resumed by the return through terminal 272. If at decision step 262 it had been determined that the current value of the process parameter velocity signal were less than the value saved at OLD then at process step 264 the incremental velocity value is set equal to the current value of the process parameter velocity signal. Thereafter, the overall cycle of operation is resumed by the return through terminal 270. It will be appreciated that the effect of the decision step 262 is to produce the resumption of the nonadaptive velocity control as illustrated by curve 146 of FIG. 4c following the point $T_r$. If at decision step 258 it had been determined that the calculated value of the process parameter velocity signal were less than the minimum value $V_{am}$ then the process would continue through decision step 259. If it is there determined that the current value of $V_K$ is less than $V_{AK}$ then a further reduction of velocity is required and the value of the increment is set to the value of the adaptive minimum velocity $V_{AM}$. Following process step 260, the overall cycle of operation is continued by the return through terminal 270.

Referring once again to FIG. 6b, it is seen that the test at decision step 210 for the state of the adaptive velocity flag provides a means of permitting the velocity value determined by the adaptive velocity procedure to control when the process parameter velocity value is determined to be less than the incremental velocity value saved at OLD. That is, the loop skipping the decision step 212 and process step 216 causes the process parameter velocity value generated by the adaptive velocity procedure to be used in the calculation of the distance increment at process step 218. When the adaptive velocity function is active but the measurement of the process parameter produces a value not requiring reduction of the current incremental velocity value, then the state of the adaptive velocity flag would result in the interpolation procedure following decision step 212 and process step 216 or 214 to produce the next increment velocity signal. The adaptive velocity control is thus made selective based on whether or not the current span has associated with it the adaptive velocity function and whether or not the current measured value of the process parameter signal requires reduction of the effective incremental velocity to produce the desired result. Particularly, considering the rough casting cleaning operation, suitable values of the process parameter reference signal may be chosen so that the torque measured by transducer 124 would produce actual values both above and below the parameter reference value. Where the measured torque is below the parameter reference value, the result of decision step 254 of FIG. 7 would be to produce a calculated process parameter velocity value. However, at decision step 262, the calculated value would be found to exceed the stored or saved incremental velocity value, and no reduction of velocity would result. On the other hand, once the measured torque exceeded the parameter reference value, the calculated adaptive velocity value would be less than the value saved at OLD and the reduced velocity value would control.

While the invention has been illustrated in some detail according to the preferred embodiment shown in the accompanying drawings, and while the preferred embodiment has been described in some detail, there is no intention to thus limit the invention to such detail. On the contrary, it is intended to cover all modifications, alterations and equivalents falling within the spirit and scope of the appended claims.

What is claimed is:

1. An apparatus for moving a function element in accordance with input signals defining with respect to a first coordinate system positions of a tool centerpoint associated with the function element, the tool centerpoint following a predetermined path between any two positions, and further input signals defining a work process parameter subject to unprogrammed variations, the apparatus comprising:
   (a) a manipulator on which the function element is mounted, the manipulator having
      (1) a plurality of members describing a plurality of axes of motion, at least some of the members being linked by axes of rotation, the members and axes of motion defining a generalized coordinate system, and
      (2) a plurality of actuators, each member having associated therewith at least one actuator for effecting motion of the member,
   (b) a manipulator control including a memory for storing input signals defining positions and a servomechanism connected to the actuators to control motion of the members, the control executing the steps of
      (1) producing in response to the work process parameter input signal a process parameter signal representing the value of a work process parameter,
      (2) producing an increment interval signal representing a period for moving the tool centerpoint through an increment of displacement along the path,
      (3) producing, in response to the process parameter signal, a process parameter velocity signal representing the effective velocity of the tool centerpoint during the period,
      (4) producing in response to the increment interval signal and the process parameter velocity signal an increment distance signal representing an increment of displacement along the path,
      (5) producing end point coordinate signals representing the coordinates with respect to the first coordinate system of an end point of the increment,
      (6) producing in response to the end point coordinate signals a set of machine coordinate signals representing coordinate values of the end point with respect to the generalized coordinate system,
      (7) applying the set of machine coordinate signals to the servomechanism to effect coordinated motion of the members to move the tool centerpoint to the position defined by the end point coordinate signals, and
      (8) iterating steps (1) through (7) to cause the tool centerpoint to move through a series of increments along the path between the positions defined by the input signals at a velocity determined in accordance with the nonprogrammed variations of the work process parameter.

2. The apparatus of claim 1 wherein the step of producing a process parameter velocity signal further comprises the steps of:
   (a) producing in response to the process parameter signal a parameter factor signal representing an arbitrarily chosen scaling of the process parameter, and
   (b) multiplying the previous process parameter velocity signal by the parameter factor signal to produce the process parameter velocity signal.

3. The apparatus of claim 2 wherein the step of producing end point coordinate signals further comprises the step of producing an accumulated increment distance signal representing the sum of the increment distance signals moved from the last position defined by input signals.

4. The apparatus of claim 3 wherein the work process parameter is torque of a cutting tool relative to a workpiece.

5. An apparatus for moving a function element in accordance with input signals defining with respect to a first coordinate system positions and path velocities therebetween of a tool centerpoint associated with the function element, the tool centerpoint following a predetermined path between any two positions, and further input signals defining a variable parameter subject to unprogrammed variations, the apparatus comprising:
   (a) a manipulator upon which the function element is mounted, the manipulator having
      (1) a plurality of members describing a plurality of axes of motion, at least some of the members being linked by axes of rotation, the members and axes of motion defining a generalized coordinate system, and
      (2) a plurality of actuators, each member having associated therewith at least one actuator for effecting motion of the member,
   (b) a manipulator control including a memory for storing input signals defining positions and path velocities and a servomechanism connected to the actutors to control motion of the members, the control executing the steps of
      (1) producing in response to the variable parameter input signal, a process parameter signal representing the value of the variable parameter,
      (2) producing an increment interval signal representing a period for moving the tool centerpoint through an increment of displacement along the path, (3) producing in response to the input signals defining positions and path velocities an increment velocity signal representing the effective velocity of the tool centerpoint during the period, (4) producing in response to the process parameter signal a process parameter velocity signal representing the effective velocity of the tool centerpoint during the period, (5) producing an increment distance signal in response to the increment interval signal and the smaller of the increment velocity signal and the process parameter velocity signal, the increment distance signal representing the distance to be moved during the period, (6) producing end point coordinate signals representing the coordinates with respect to the first coordinate system of an end point of the increment, (7) producing in response to the end point coordinate signals a set of machine coordinate signals representing coordinate values of the end point with respect to the generalized coordinate system, (8) applying the set of machine coordinate signals to the servomechanism to effect coordinated motion of the members to move the tool centerpoint to the positions defined by the end point coordinates, and (9) iterating steps (1) through (8) to cause the tool centerpoint to move through a series of increments between the positions defined by the input signals at a velocity selectively defined by the input signals and by the unprogrammed variations of the variable parameter.

6. The apparatus of claim 5 wherein the step of producing a process parameter velocity signal further comprises the steps of:

(a) producing in response to the process parameter signal a paramater factor signal representing an arbitrarily chosen scaling of the process parameter; and (b) multiplying the previous process parameter velocity signal by the parameter factor signal to produce the process parameter velocity signal.

7. The apparatus of claim 6 wherein the variable parameter is torque of a cutting tool relative to a workpiece.

8. An apparatus for moving a function element in accordance with preprogrammed input signals defining with respect to a first coordinate system positions and path velocities therebetween of a tool centerpoint associated with the function element, the tool centerpoint following a predetermined path between any two positions, and further preprogrammed input signals defining a process parameter reference value and further input signals defining a work process parameter subject to unprogrammed variations, the apparatus comprising:

(a) a manipulator upon which the function element is mounted, the manipulator having (1) a plurality of members describing a plurality of axes of motion, at least some of the members being linked by axes of rotation, the members and axes of motion defining a generalized coordinate system, and (2) a plurality of actuators, each member having associated therewith at least one actuator for effecting motion of the member, (b) a manipulator control including a memory for storing preprogrammed input signals and a servomechanism connected to the actutor to control motion of the members, the control executing the steps of (1) producing, in response to the work process parameter input signal, a process parameter signal representing the value of a work process parameter, (2) producing a process parameter velocity signal in response to the value of the process parameter signal differing from the value of the process parameter input signal, the process parameter velocity signal representing the value of a velocity function dependent on the difference, (3) producing an increment interval signal representing a period for moving the tool centerpoint through an increment along the path, (4) producing an increment velocity signal in response to the preprogrammed input signals defining positions and path velocities, the increment velocity signal representing the velocity of the tool centerpoint during the period, (5) producing in response to the increment interval signal and selectively the process parameter velocity signal and the increment velocity signal an increment distance signal representing an increment of displacement along the path, (6) producing end point coordinate signals representing the coordinates with respect to the first coordinate system of an end point of the increment, (7) producing in response to the end point coordinate signals a set of machine coordinate signals representing coordinate values of the end point with respect to the generalized coordinate system, (8) applying the sets of machine coordinate signals to the servomechanism to effect coordinated motion of the members to move the tool centerpoint to the position defined by the end point coordinate, and (9) iterating steps (1) through (8) to cause the tool centerpoint to move through a series of increments between two positions defined by the input signals.

9. The apparatus of claim 8 wherein the control further executes the steps of:

(a) producing an adaptive control status signal representing a condition for which a process parameter velocity signal is effective for an increment;

(b) storing the increment velocity signal when the status signal represents the condition is false;

(c) comparing the process parameter velocity signal to the stored increment velocity signal;

(d) setting the status signal to reflect the condition is false in response to the process parameter velocity signal being not less than the stored signal; and (e) selecting for the effective velocity signal the smaller of the process parameter velocity signal and the stored increment velocity signal.

10. The apparatus of claim 9 wherein the step of producing an increment velocity signal further comprises the steps of:

(a) testing the adaptive control status signal for the state thereof; and (b) inhibiting producing of the increment velocity signal in response to the status signal representing a true condition.

11. The apparatus of claim 10 wherein the step of producing a process parameter velocity signal further comprises the steps of:
(a) producing in response to a difference between the process parameter signal and the preprogrammed process parameter reference signal, a parameter factor signal representing arbitrarily chosen scaling of the difference; and
(b) multiplying the previous process parameter velocity signal by the parameter factor signal to produce the process parameter velocity signal.

12. The apparatus of claim 11 wherein the work process parameter is relative torque between the cutting tool and a workpiece.

13. An apparatus for moving a function element in accordance with preprogrammed input signals defining with respect to a first coordinate system positions and path velocities therebetween of a tool centerpoint associated with the function element, the tool centerpoint following a predetermined path between any two positions, and further preprogrammed input signals defining an adaptive velocity function and a work process parameter value and further input signals defining a work process parameter subject to unprogrammed variations, the apparatus comprising:
(a) a manipulator upon which the function element is mounted, the manipulator having
  (1) a plurality of members describing a plurality of axes of motion, at least some of the members being linked by axes of rotation, the members and axes of motion defining a generalized coordinate system, and
  (2) a plurality of actuators, each member having associated therewith at least one actuator for effecting motion of the member,
(b) a manipulator control including a memory for storing preprogrammed input signals and a servomechanism connected to the actuator to control motion of the member, the control executing the steps of
  (1) producing a process parameter signal representing the value of a work process parameter,
  (2) producing in response to the adaptive velocity function signal, the process parameter signal, and the process parameter reference signal, a process parameter velocity signal representing the value of a velocity function dependent on the value of the work process parameter,
  (3) producing an increment interval signal representing a period for moving the tool centerpoint through an increment along the path,
  (4) producing an increment velocity signal in response to the preprogrammed input signals defining positions and a path velocity therebetween, the increment velocity signal representing the velocity of the tool centerpoint during the period,
  (5) producing in response to the increment interval signal and selectively the process parameter velocity signal and the increment velocity signal an increment distance signal representing an increment of displacement along the path,
  (6) producing end point coordinate signals representing the coordinates with respect to a first coordinate system of an end point of the increment,
  (7) producing in response to the increment end point coordinate signals a set of machine coordinate signals representing coordinate values of the end point with respect to the generalized coordinate system,
  (8) applying the set of machine coordinate signals to the servomechanism to effect coordinated motion of the members to move the tool centerpoint to the position defined by the end point coordinate, and
  (9) iterating steps (1) through (8) to cause the tool centerpoint to move through a series of increments between the positions defined by the preprogrammed input signals.

14. The apparatus of claim 13 wherein the step of producing a process parameter velocity signal further comprises the steps of:
(a) producing, in response to a difference between the process parameter reference signal and the process parameter signal a parameter factor signal representing an arbitrarily chosen scaling of the difference; and
(b) multiplying the previous process parameter velocity signal by the parameter factor signal to produce the process parameter velocity signal.

15. The apparatus of claim 14 wherein the step of producing the increment distance signal further comprises the steps of:
(a) comparing the increment velocity signal to the process parameter velocity signal;
(b) selecting the increment velocity signal when the increment velocity signal is found to be less than the process parameter velocity signal; and
(c) selecting the process parameter velocity signal when the process parameter velocity signal is found to be less than the increment velocity signal.

16. The apparatus of claim 15 wherein the work process parameter is relative torque between a cutting tool and workpiece.

* * * * *